June 25, 1940.  H. J. FAUSNAUGH  2,205,879
TOOL HOLDER
Original Filed Sept. 30, 1937
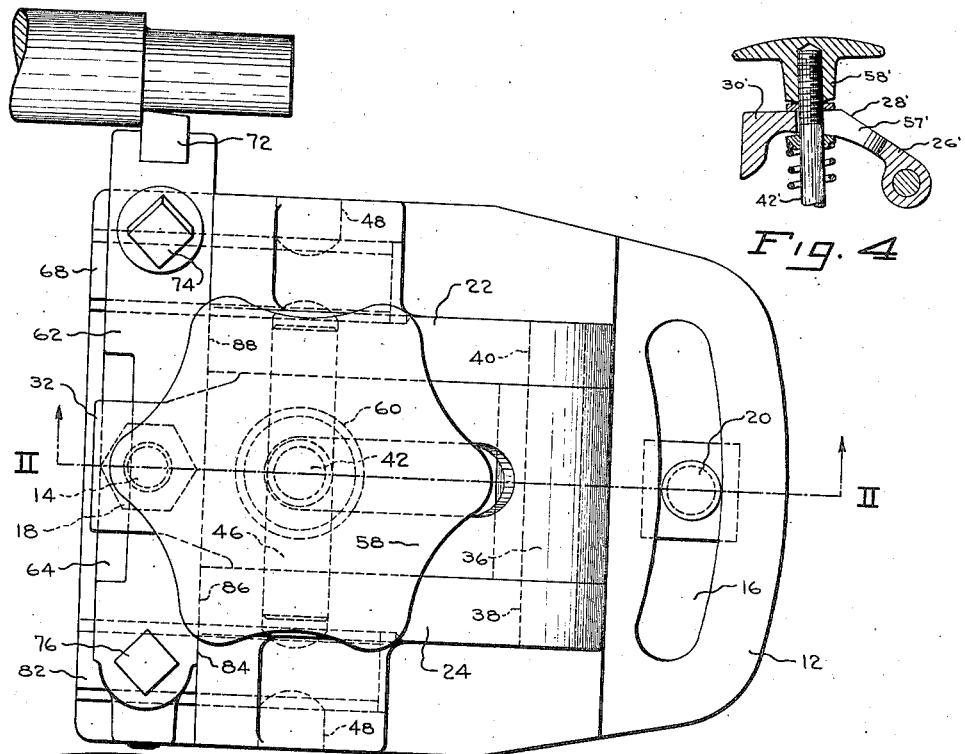
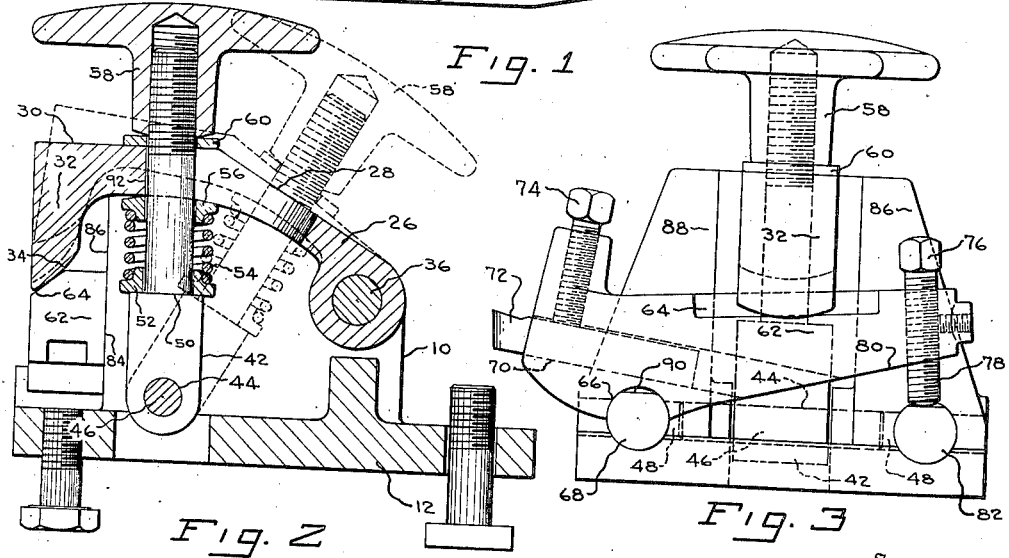
Inventor
HAROLD J. FAUSNAUGH
By Beaman & Langford
Attorneys Patented June 25, 1940

2,205,879

UNITED STATES PATENT OFFICE 2,205,879

TOOL HOLDER

Harold J. Fausnaugh, Three Rivers, Mich.

Application September 30, 1937, Serial No. 166,532
Renewed November 24, 1939

9 Claims. (Cl. 82—36)

The present invention relates to improvements in tool holder fixtures for lathes and the like of the general character and purpose of that shown in United States Letters Patent No. 1,229,802.

One of the objects of the invention is to provide novel structure for facilitating the clamping and unclamping of the tool holder in the fixture.

Another object is to reduce the cost of manufacture by reducing and simplifying the several parts of the tool holder fixture.

A further object resides in the novel manner in which the tool holder is clamped in the fixture and the means provided for accurately and firmly clamping the tool holder enabling quick change of tools and avoiding any necessity of readjusting or centering upon each tool change.

Other objects and advantages residing in the combination and construction and arrangement of parts will become apparent from consideration of the detailed description to follow.

One form of the invention for accomplishing the above outlined objects is illustrated in the accompanying drawing wherein Fig. 1 shows the tool holder in clamped position within the fixture upon the carriage of a lathe with the tool presented to the work, Fig. 2 is a cross-sectional view taken on line II—II of Fig. 1 of the tool holder fixture removed from the lathe, Fig. 3 is an elevational view of the tool holder fixture shown in Fig. 1 as viewed from the left end thereof, and Fig. 4 is a cross-sectional view corresponding to a portion of Fig. 2, disclosing a modified form of a part of my invention.

Referring to the drawing, the tool holder fixture 10 comprises a base 12 having bolt holes 14 and 16 to receive bolts 18 and 20 for firmly securing the same upon the lathe carriage. Preferably the bolt hole 16 is of elongated arcuate shape to enable the fixture to be swung about the axis of the bolt 18 to vary the angularity of the tool. Integral with the base 12 are spaced upstanding webs 22 and 24 between which is positioned a clamping member 26 having an inclined portion 28, a flat top portion 30 and a depending nose portion 32 with an inclined clamping face 34. The member 26 is supported for swinging movement upon a pin 36 in turn supported at opposite ends in aligned holes 38 and 40, in the webs 22 and 24.

A clamp bolt 42 has an aperture 44 in the lower end to receive a pin 46 for pivotally supporting the bolt. A straight through hole 48 is provided in the base 12 for assembling the pin 46 and bolt 42 in pivotal supporting relation. The diameter of the bolt 42 is reduced to provide a shoulder 50 upon which rests a washer 52 constituting a seat for the spring 54. A similar washer 56 provides a seat for the upper end of the spring 54 which urges the same against the underside of the clamping member 26 tending to rotate the latter to the dotted line position shown in Fig. 2. The bolt 42 is passed through an elongated slot 57 provided in the portions 28 and 30 of the clamping member 26. A hand operated nut 58 is threaded upon the upper end of the bolt 42. As shown, a hardened washer 60 is interposed between the upper surface of the member 26 and the end of the nut 28. Upon screwing the nut 58 downward the pressure applied by the nut through the washer 60 upon the portion 30 brings the nose 32 into rigid clamping relation with the tool holder 62. A fractional turn of the nut 58 will permit the bolt 42 to be swung to the dotted line position shown in Fig. 2. With the bolt 42 thus positioned the member 26 is then free to likewise swing to the dotted line position under the stress of the spring 54 so that the nose 32 clears the tool holder 62 permitting removal of the same. Movement of the bolt 42 and nut 58 from the dotted line position to the full line position of Fig. 2 swings the nose 32 toward the tool holder 62 through camming action between the washer 60 and the inclined portion 28. A slight twist of the operator's wrist is then all that is necessary to firmly clamp the surface 34 of the nose 32 against the complementary surface 64 of the tool holder 62.

The tool holder 62 preferably takes the form of a cast steel body having a semi-circular inverted recess 66 at its forward end to receive a hardened rest 68 of the tool holder fixture 10. In a socket 70 is received the tool 72 which is held in adjustable position by a set screw 74 in a well known manner. At the rear end of the tool holder 62 is provided an adjustable set screw 76 having the lower end 78 thereof extending below the underside 80 of the tool holder 62 for engagement with the hardened rest 82 corresponding to the rest 68. Adjustment of the set screw 76 provides variation in angular adjustment for centering and positioning the tool 72 with reference to the work at the time of the initial set up. The tool holder 62 is illustrated as having a vertical side 84 which abuts against abutment faces 86 and 88 of the webs 22 and 24, at the time the tool holder 62 is clamped in position by the nose 32 of the clamping member 26. The rest 68 is preferably provided with a flattened upper surface 90 providing clearance between the rest 68 and recess 66 of the tool holder 62 so that any accumulation of dirt and foreign matter upon the tool rest 68 will not have the effect of improper location of the tool holder 62. It will be understood that in commercial use there will be several tool holders corresponding to the tool holders 62 which will be successively clamped and unclamped from the tool holder fixture in the machining of a single work piece.

It should be readily apparent to those skilled in the art that the inclination of the engaging surfaces 34 and 64 under the influence of counter-clockwise swinging movement of the member 26 around the pin 36 will force the side 84 of the tool holder 62 firmly against the abutment faces 86 and 88. As more clearly appears from Fig. 1, it will be seen that the abutment faces 86 and 88 are well spaced apart and that the point of engagement between the nose 32 and tool holder 62 is located in a plane between these abutment faces giving unrocking, lateral, three-point support to the tool holder 62. The point of engagement of the nose 32 with the tool holder is likewise between the rest 68 and 82 giving three-point support to the tool holder 62 at right angles to the plane of support offered by the abutment faces 86 and 88.

As shown in Figs. 2 and 3 the surface 34 is curved in two different planes so that the pressure of the nose 32 against the flat surface 64 is concentrated.

In using the tool fixture herein illustrated the operator swings the bolt 42 and nut 58 into the dotted line position shown in Fig. 2. The clamping member 26 is then in the raised position shown in dotted outline and the tool holder 62 may be positioned upon the rests 68 and 82. The operator then rocks the bolt 42 to the left toward the full line position shown in Fig. 2 by pushing on the nut 58 and the camming action of the washer 60 traversing along the inclined portion 28 will bring the surface 34 of the nose 32 into contact with the surface 64 of the tool holder 62. Movement of the bolt 42 to the left as viewed in Fig. 2 is limited through engagement with the end wall 92 of the slot 56 which positions the bolt 42 in the vertical full line position shown in Fig. 2. To firmly clamp the tool holder 62 upon the rests 68 and 82 and against the abutment faces 86 and 88, it is only necessary that the operator impart a fractional rotation to the nut 58 through a twist of his wrist. To remove the tool holder 62 a similar fractional twist in the opposite direction will permit rocking of the bolt 42 from the vertical position shown in Fig. 1 off the flat portion 30 and toward the dotted line position.

Fig. 4 discloses an embodiment of my invention for use wherein a particularly large adjustment of the tool holder 62 by the set screw 76 is desired. When the set screw 76 is particularly long in order to permit a particularly great lowering of the front of the tool holder 62, it has been found that there is sometimes a tendency for the hand clamping nut 58 to slip. Under these conditions the difficulty may be eliminated by providing a clamping member 26′ as shown in Fig. 4, having its surface 30′ somewhat more inclined toward the left with respect to the inclined portion 28′ than the inclination of the corresponding surface 30 with respect to the inclined portion 28 as disclosed in Fig. 2. With the surface 30′ of greater inclination, it becomes necessary to have a slightly greater pivotal movement of the clamping bolt 42′ and its clamping hand nut 58′. To permit this greater pivotal movement the slot 57′ extends a slightly greater distance to the left as shown in Fig. 4.

From the foregoing description of the present invention it should become apparent that I have provided a tool holder fixture for lathes and the like which will permit tool holders to be positioned and removed with greater rapidity and with slight exertion upon the part of the operator. At the same time the parts of the tool holder fixture have been considerably reduced over that shown in the aforesaid patent and are all capable of being cast from steel or other suitable metal, with the exception of the bar stock part, with a minimum amount of machining.

Having described my invention, what I claim and desire to protect by Letters Patent is:

1. A tool holder fixture of the type described comprising a pair of members supported for pivotal movement about spaced axes, one of said members having a tool holder engaging part, the other of said members having means for engaging with said first member to rock said part toward the tool holder, said first member upon relative rocking movement between said members being engageable by said means at different points along the longitudinal axis of said first member, and a cam surface presented by said first member to said means, said members having such configurations that said other member is rockable from adjacent the pivotal axis of said first member, the rocking of said other member from adjacent the pivotal axis of said first member and the traversing of said means along said cam surface rocking said part toward said tool holder.

2. A tool holder fixture of the type described comprising spaced rests upon which a tool holder is adapted to be supported, spaced abutment faces against which the tool holder is adapted to be clamped, a swinging member having a clamping portion for engagement with the tool holder between said rests and abutment faces, a swinging bolt pivotally supported between the pivot of said swinging member and said spaced rests, an elongated slot in said swinging member through which said bolt projects, clamping means including a nut upon said bolt engaging with said swinging member, said bolt being rocked around its pivot toward the pivot of said swinging member to permit said swinging member to be raised from the tool holder and being rocked away from the pivot of said swinging member to move the same toward the tool holder, said nut upon rotation rocking said swinging member into tool holder clamping position.

3. A tool holder fixture comprising a fixed body, a seat upon said body for supporting a tool holder, a clamping member having pivotal connections at one end with said body and overhanging said seat at the opposite end, a swinging bolt having pivotal connections with said body at one end and threads upon its opposite end, a portion of said clamping member defining a cam surface, means associated with said bolt upon swinging movement thereof riding upon said cam surface to rock said clamping member, said last means including a nut received upon the threaded end of said bolt for additional rocking of said clamping member.

4. A tool holder fixture comprising means upon which the tool holder is supported and clamped, a clamping member having one end pivotally supported to one side of said means and the other end overhanging said means, means for rocking said overhanging end toward and from said first means and for clamping said overhanging end upon the tool holder, said last means including an operating member pivotally supported at one end between said first means and the pivoted end of said clamping member, said rocking and clamping means being arranged so that upon pivotal movement of said operating member it engages with said clamping member at different points along its length to rock the latter relative to said first means.

5. A tool holder fixture of the class described comprising a fixed body, a seat upon said body upon which a removable tool holder is adapted to be supported and rigidly clamped, a clamping member having pivotal connections with said base to one side of said seat, the opposite end of said clamping member overhanging said seat and having a nose portion for engagement with the tool holder, said clamping member when in tool holder engagement position having a substantially horizontal portion and a portion angularly inclined thereto, both of said portions being contiguous and being disposed between said nose and the pivotal connection of said clamping arm of said body, an elongated slot extending axially of said clamping member and defined in said horizontal and inclined portions thereof, a swinging bolt having pivotal connection with said body between said seat and the pivotal connection of said clamping member of said body, a portion of said bolt projecting through said slot, a manually adjustable nut threaded upon the outer end of said bolt and offering an abutment limiting swinging movement of said clamping member from tool holder clamping position, said inclined portion of said clamping member being disposed at a lesser distance from the pivotal axis of said swinging bolt than said horizontal portion, said nut being adapted to be screwed down against said horizontal portion to rigidly clamp the nose of said clamping member upon the tool holder, the swinging of said bolt to locate said nut above said inclined portion permitting swinging movement of said clamping member away from the tool holder without any additional rotation of said nut.

6. A tool holder fixture of the class described comprising an oscillatory clamp for engagement with the tool holder, an oscillatory bar for operating said clamp pivoted below said clamp, a spring continuously urging said clamp out of clamping position, an adjustable abutment upon said bar above said clamp, said abutment limiting the movement of said clamp under the influence of said spring upon oscillatory movement of said bar, the shape of said clamp causing said clamp to be further removed from clamping position with said bar swung more adjacent the pivotal axis of said clamp and more adjacent clamping position with said bar swung more removed from the pivotal axis of said clamp, adjustment of said abutment in one direction axially of said bar with said bar in said last position acting upon said clamp to rigidly clamp the tool holder in position.

7. A tool holder fixture of the type described comprising spaced rests upon which a tool holder is adapted to be supported, spaced abutment faces against which the tool holder is adapted to be clamped, a swinging member having a clamping portion for engagement with the tool holder between said rests and abutment faces, a swinging bolt pivotally supported between the pivot of said swinging member and said spaced rests, an elongated slot in said swinging member through which said bolt projects, clamping means including a nut upon said bolt engaging with said swinging member, and means resiliently urging said swinging member against said clamping means, said bolt being rocked around its pivot toward the pivot of said swinging member to permit said swinging member to be raised from the tool holder and being rocked away from the pivot of said swinging member to cam the same toward the tool holder, said nut upon rotation rocking said swinging member into tool holder clamping position.

8. A tool holder fixture of the class described, comprising a fixed body, a pivoted clamping member, an operating member pivoted below said clamping member and having a portion extending above said clamping member, said members being in crossed relation with a part of said operating member overriding said clamping member, said members being so shaped that the rocking of said operating member causes the same to bear against said clamping member to rock the same, and adjustable means for varying the position of the portion of said operating member bearing against said clamping member to further rock said clamping member.

9. A tool holder fixture of the class described, comprising a fixed body, a clamping member pivoted at one end thereof and having a clamping nose at the other end thereof, an operating member pivoted at one end thereof below said clamping member and having the other end thereof extending above said clamping member, said members being in crossed relation with a portion of said operating member overriding and bearing against said clamping member in camming relation thereto, said operating member when rocked camming said clamping member to rock it about its pivot, and means to resiliently hold said rocking member in camming relation to said operating member.

HAROLD J. FAUSNAUGH.